United States Patent [19]

Schuchman et al.

[11] Patent Number: 5,598,472
[45] Date of Patent: Jan. 28, 1997

[54] CHARGE-COUPLED-DEVICE BASED ALL-ANALOG WAVE FORM SCRAMBLING WITH APPLICATIONS IN AUDIO, VIDEO, VIDEO-ON-DEMAND, AND TV SYSTEMS

[75] Inventors: Leonard Schuchman; Aaron Weinberg, both of Potomac, Md.

[73] Assignee: Stanford Telecommunications, Inc., Reston, Va.

[21] Appl. No.: 362,269

[22] Filed: Dec. 22, 1994

[51] Int. Cl.⁶ .................................................. H04N 7/167
[52] U.S. Cl. .................................................. 380/14; 380/21
[58] Field of Search ........................................ 380/14, 21

[56] References Cited

U.S. PATENT DOCUMENTS

| | | |
|---|---|---|
| 4,600,942 | 7/1986 | Field et al. |
| 4,663,659 | 5/1987 | Blatter ........................................ 380/14 |
| 4,901,349 | 2/1990 | Metzger et al. ........................... 380/14 |

Primary Examiner—Stephen C. Buczinski
Attorney, Agent, or Firm—Jim Zegeer, Esquire

[57] ABSTRACT

A scrambled analog signalling system having a source of analog signals to be sent to a receiving device is comprised of a multiple stage charge coupled device (66) having analog signal input terminals connected to receive analog signal samples from said source of analog signals. The multiple stage charge coupled device having N stages, corresponding stage taps, and an input clock signal. A shuffling circuit (68) having a first input connected to the N stage taps for receiving the analog signal samples and second input for receiving a random seed (67) signal to cause a random reordering of incoming analog signal samples, a source of random seed signals connected to the second input, and an output device (72) connected to receive a stream of the analog signal samples which have been shuffled according to a mapping code carried by the random seed signal. A filter for reconstructing the analog signal in its scrambled format, and a transmission system for conveying the analog signal in its scrambled format to the receiving device.

6 Claims, 11 Drawing Sheets

CHARGE-COUPLED-DEVICE BASED ALL-ANALOG WAVE FORM SCRAMBLING WITH APPLICATIONS IN AUDIO, VIDEO, VIDEO-ON-DEMAND, AND TV SYSTEMS

REFERENCE TO RELATED APPLICATIONS

The present invention is related to application Ser. No. 08/205,496, entitled "RECEIVER HAVING CHARGE-COUPLED-DEVICE BASED RECEIVER SIGNAL PROCESSING", filed Mar. 4, 1994. The invention is also related to U.S. Pat. No. 5,126,682 entitled "DEMODULATION METHOD AND APPARATUS INCORPORATING CHARGE-COUPLED-DEVICES", issued June 1992.

The present invention is directed to a charge-coupled device (CCD) based waveform scrambling device. The waveform can be a TV signal compatible with NTSC, PAL, or SECAM systems, video, audio, or other types of signal. The scrambling method is all-analog in which no processing in the digital domain is necessary, but there can be an analog-to-digital conversion after the processing.

BACKGROUND AND BRIEF DESCRIPTION OF THE INVENTION

As the consumer and commercial market for the distribution of data and video information expands, the industry is striving for design of high performance, secure, and inexpensive scrambling devices for preventing unauthorized users and providing adequate security performance. In the pay-per-view data and video distribution industry, where set-top boxes are installed at customer sites, it is extremely important to keep the costs down.

The previously implemented signal scrambling systems are mostly designed based on the encryption schemes. These techniques are generally considered to be expensive for the consumer market as the processing is performed in the digital domain, thus requiring high-speed analog-to-digital (A/D) and digital-to-analog (D/A) converters.

In using the analog-to-digital and digital-to-analog converters, there is often a trade-off between cost and performance. Higher resolution and higher speed of conversion are required for the signals where high fidelity is a crucial design guideline, such as a video signal containing moving objects. It may not always be possible to maximize the resolution and conversion speed while minimizing cost; thus a decision has to be made as to which are the most important requirements for a particular system. High conversion speeds are required for signals at video rates (7–20 MHz) which typically demand a trade-off between the resolution and cost.

The present invention provides a standalone CCD-based scrambling technique which operates on the signal in the analog domain, and provides performance comparable to, or better than, digital, but at lower cost. The CCD-based device can have additional on-chip functions performed, such as timing circuitry and the like. In particular, the device is suitable for scrambling of the analog video signal to render it unviewable but capable of high fidelity reconstruction and being displayed without any need for modification to standard video equipment.

CCD technology has been used for many years. CCD image sensing technology is widely developed for the commercial and military camera market. However, recent advances in CCD design and fabrication have led designers to consider new applications for this technology. For example, see Weinberg et al. U.S. Pat. No. 5,126,682, which relates to an inexpensive and highly integrated demodulation system incorporating CCD devices.

The CCD is a combination of analog and digital circuitry which benefits from the advantages of both worlds. Its analog input matches well with wideband and narrow-filtered signals and the device can produce a digital output when directly integrated with an A/D converter. Furthermore, the device may be controlled and clocked digitally thereby providing a natural interface with a system processor. When configured as an analog shift-register or delay line with temporary storage capability to support waveform scrambling in the analog domain, the CCD offers several key features including:

analog-domain processing without a need for A/D and D/A conversion wideband input that readily accommodates video bandwidths wide input dynamic range variable clocking rates of KHz-to-at least 10's of MHz independent input and output clocking rates (i.e., can provide rates buffering)

large number of stages very low power consumption charge domain processing direct and fast sample retrieval The present invention provides a high level of security against unauthorized descrambling of the processed waveform. The waveform is shuffled in the analog domain in a random sequence which is known only to the descrambling device. This feature is particularly useful in the pay-per-view video distribution industry where a video title is downloaded to a pre-authorized customer via the existing cable TV or other transport links, scrambled by the set-top box and recorded on the VCR tape, all in realtime. The set-top box is used to de-scramble the VCR output for display on the TV screen at a later time. As both the scrambling and de-scrambling functions are integrated in the set-top design, the low cost of the analog, CCD-based scrambling technique is of significant importance.

Adequate security codes are included in the scrambled signal to assure that the tape can only be de-scrambled by the original scrambling set-top box. Timing and billing information can also be included to prevent the set-top box from de-scrambling after a preset deadline expires. The additional security, timing and billing information can be inserted either at the source distribution center or downloaded to the set-top.

THE PRESENT INVENTION

The present invention provides a scrambling technique where analog samples of a waveform are shuffled to render the output signal unusable unless the shuffled samples are rearranged in the original order. The scrambling process is performed on the all-analog waveform in the analog domain and there is no need for converting the signal for processing in the digital domain. Depending on the scrambler architecture, the original waveform is altered differently. For example, the pixels within segments of a single video line or the pixels on a whole video lines can be shuffled randomly. The scrambling device is based on charge-coupled device technology. CCD is a charge-transfer device that stores charge in potential wells and transfers this charge as an analog voltage which is exactly proportional to the amount of the charge.

3

For the design of the waveform scrambler, the CCD is utilized as an analog delay line or shift-register device with the capability to hold the well charges for a short period of time. Depending on the architecture of the scrambler, two or more CCDs are used, with additional circuitry to provide timing references. Four different implementations or embodiments are described for the scrambler device. Regardless of the implemented scrambler architecture, the overall concept remains the same for all the proposed embodiments: analog samples of the analog input signal are shifted into the CCD. The samples are then read out in a pre-determined random order (shuffled) and low-pass-filtered to create the output analog scrambled signal. This process is reversed at the descrambler in order to rearrange the shuffled samples and reconstruct the original signal. The samples are either shifted out of the CCD or retrieved from the individual CCD cells while the device is holding the charge in between the shifts. The input and output shift-register clocking rates are kept equal in order to eliminate the need for additional storage, prevent buffer overflow, and eliminate any delays between the input and output signal streams as they are shifted in and out of the CCD-based shift-registers.

For the case of the TV signals, the scrambled signal can be stored on a standard VCR tape. For viewing at a later time, the VCR output is sent to the descrambler module where the analog samples of the scrambled signal are rearranged to produce the original signal.

DESCRIPTION OF THE DRAWINGS

The above and other objects, advantages and features of the invention will become more apparent when considered with the following specification and accompanying drawings wherein.

DETAILED DESCRIPTION

The waveform scrambler/descrambler device is conveniently described with reference to a Community Antenna Television (CATV) system which distributes movies (video signals) to customer homes; however the principles of this invention are applicable to other television and video distribution systems, as well as to other types of signals. To better demonstrate the applicability of the patent, standard NTSC television signal is considered to be the reference input signal to the scrambler module in all the proposed architectures. The structure of this signal is explained next.

Figure 1:
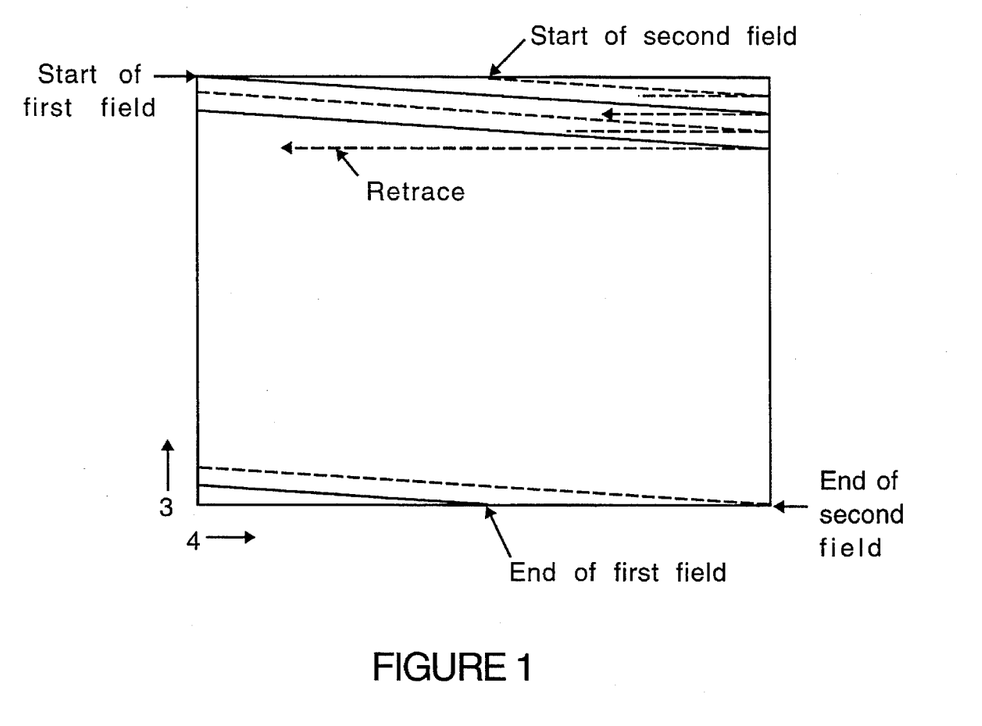
FIG. 1 shows the standard NTSC TV signal interlaced scanning.
Figure 2:
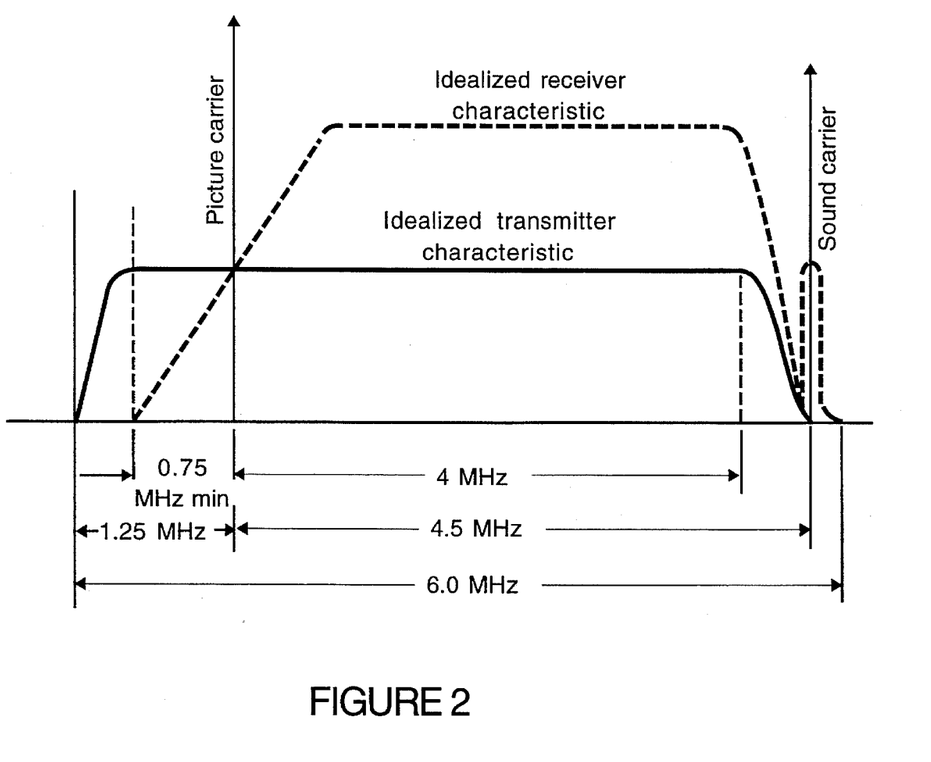
FIG. 2 shows the spectrum of the standard NTSC TV signal.

FIG. 1 shows the standard NTSC TV scanning. To eliminate flicker in the television picture, alternate lines are sent at a rate of 60 per second. This is called interlaced scanning. The scan starts at the upper left and proceeds from left to right, retracing quickly alter each scan. This is repeated to the bottom of the display, where only a half-line is scanned. A total of 262.5 lines have now been scanned and this is called a field. Therefore each picture is divided into 525 lines and is scanned line-by-line. The time for one complete scan of a picture is chosen to be 1/30 second. If we consider the complete picture as an array of 700×525 dots of varying intensity, then there are a maximum of (700)(525)(30)=11,025,000 picture elements to be sent each second. Using the criterion that the system rise time must equal one picture element, a system bandwidth of 4 MHz is selected in practice to accommodate the 54 microseconds long video portion of the TV scan line. FIG. 2 shows the spectrum for the NTSC video signal along with the FM modulated audio which has a peak frequency deviation of 25 KHz and is centered 4.5 MHz above the video carrier.

The CCD block of the CCD-based scrambler/descrambler module accepts the analog samples of the video portion of the analog TV signal as input. A stable clock samples the input signal and shifts the analog samples into the CCD block cells.

Figure 3:
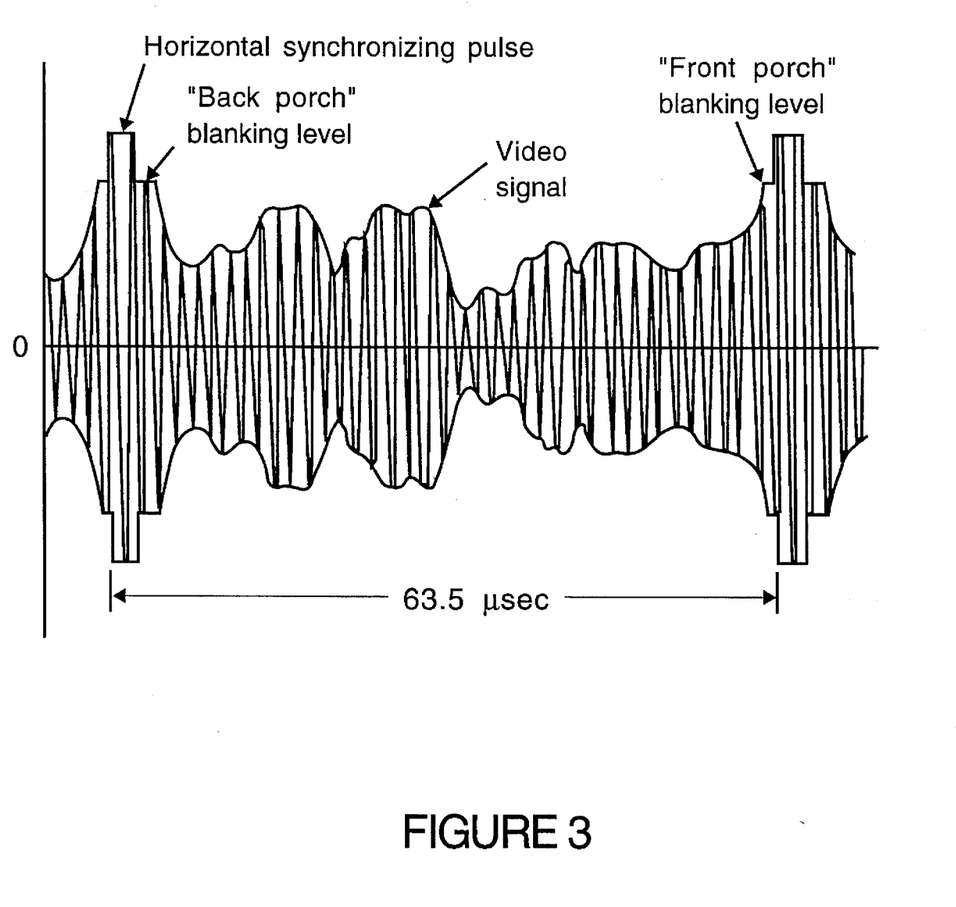
FIG. 3 shows the amplitude modulated levels used for the video waveform.

Proper synchronization is necessary to reconstruct a stable picture. Synchronization pulses are sent every 63.5 microseconds at the beginning of each line scan. A blanking level is also sent, making sure that the horizontal and vertical retraces are not visible in the display. FIG. 3 shows the video-modulated waveform along with the horizontal synchronization pulses. The synchronization pulses are separated to provide the CCD-based scrambling circuitry and other system modules with time references.

The scrambling is performed only on the video portion of the TV signal. The scrambler output signal is used to reconstruct the standard NTSC TV signal by insertion of the synchronization pulses. The resulting signal can be transmitted or broadcasted, stored on a standard VCR, or displayed on a TV set although its content remains unviewable due to the effect of the scrambling process.

The key relations which define the CCD as a scrambling/descrambling device for the NTSC TV signal are:

| | | |
|---|---|---|
| Fc | = | CCD block clock rate |
| N | = | number of taps in one CCD block to hold one scan line |
| I | = | number of CCD blocks to hold one scan line |
| N/I | = | number of taps in each CCD block to hold a segment of a scan line (segment size) |
| T total | = | total TV horizontal scan line = 63.5 microseconds |
| T active | = | active TV horizontal scan line = 54 microseconds |
| BW | = | TV active video signal bandwidth = 4 MHz |

For a CCD clock rate Fc of 18.962963 Msps, one active TV scan line requires a CCD block with N=1024 taps. Breaking an active video scan line into two equal segments (I=2) hence requires two CCD blocks of 512 taps each to accommodate a full TV scan line, etc.

Figure 4:
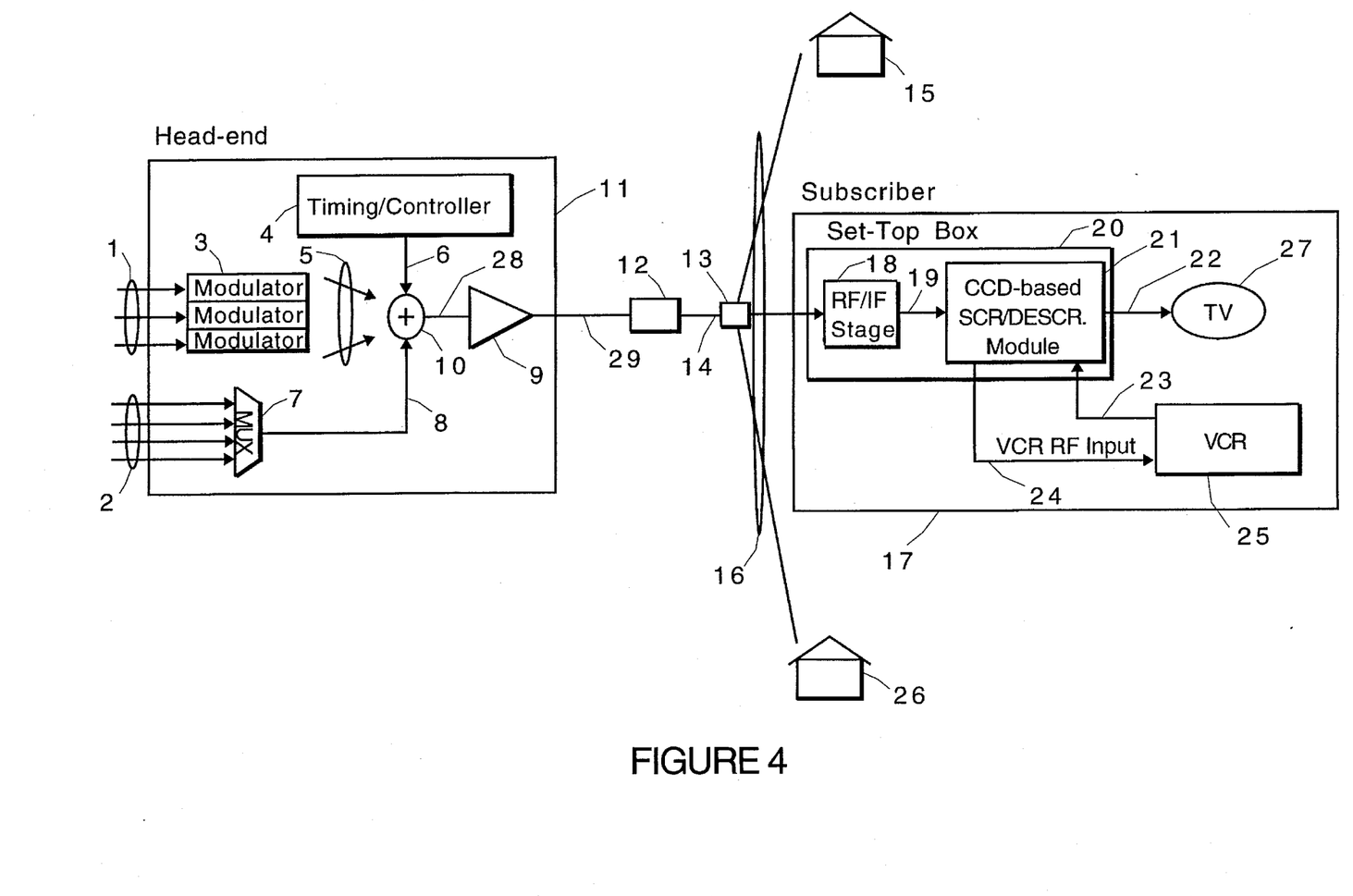
FIG. 4 shows a typical video-on-demand system used to illustrate the application of the CCD-based waveform scrambler/descrambler in video distribution technology.

FIG. 4 shows a typical video-on-demand system. The system is used for the mass distribution of video and TV signals from a central distribution facility to subscribers via a hybrid fiber-coax or other transmission media. For the purpose of this patent, the return links from the subscriber to the central facility which may exist to support interactive applications are not shown.

The video head-end 11 is the origination point for analog signals 1 and digital signals 2 which are received by way of antenna, microwave, land lines from a local TV station, or a Video Cassette Recorder (VCR). The received signals at the video head-end include programs which are stored on a variety of media including compact disks, hard disks, conventional magnetic tapes, or electronics memory. Digital video streams 2 are multiplexed in the multiplexer module 7; the digital output stream 8 may contain more than one TV channel. The frequency agile modulators 3 are used to provide the necessary IF channel assignment for TV signals 5. The controller unit 4 inserts timing and control signals necessary to provide the subscriber equipment with authorization and addressing information. The combining circuit 10 receives the modulated analog video signal 5, the multiplexed digital video stream 8, and the authorization and control signal 6 and outputs signal 28 consisting of several analog and digital video channels.

Land lines such as coaxial cables or fiber optic cables are utilized for transmitting programs to a group of subscribers 15, 17, and 26. The amplifier unit 9 converts the composite TV signal 28 and provides adequate power gain needed for distributing the composite signal via the fiber optic path 29 to the optical-to-electrical converter unit 12. The line extender and splitter unit 13 is used to distribute the composite signal 16 to the subscriber population. The transmission media 14 and the links 16 to the subscriber premises are coaxial cables.

The input to the set-top box 20 located at the subscriber premises 17 is a composite FDM video signal carrying several TV channels in accordance with the NTSC or other standards; although it can also be a single TV channel signal. At the set-top box, the RF/IF stage module 18 selects a single TV channel and outputs a standard TV signal 19. In the existing cable TV systems, this signal can either be displayed on TV or recorded on a Video Cassette Recorder. In the current application, the standard TV signal output of the RF/IF stage is scrambled by the CCD-based SCR./DESCR. module 21 before it is stored on the VCR unit 25. The VCR output 23 is sent to the SCR./DESCR. module where it is descrambled. The signal 24 is an analog TV signal which is reconstructed from the scrambled analog video samples. The output signal 22 of the SCR./DESCR. module can be displayed and viewed on TV set 27. Also the VCR output can be fed directly to the TV set for display of the unviewable scrambled video signal; this would occur if the descrambling code is not available.

Figure 5:
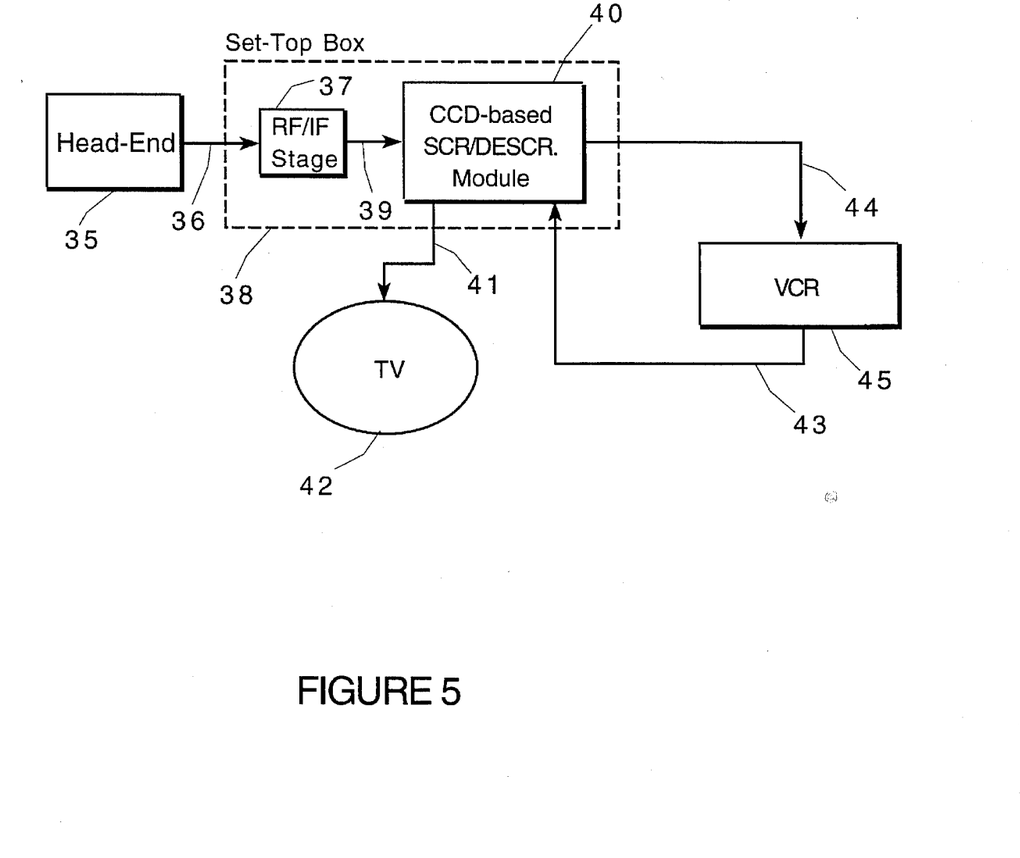
FIG. 5 illustrates an end-to-end video-on-demand system with the CCD based waveform scrambler/descrambler device used for scrambling and recording the video signal and subsequent descrambling of the unviewable signal for display on TV.

FIG. 5 illustrates an end-to-end video-on-demand system with the CCD-based waveform scrambler/descrambler device used for scrambling and recording of the video signal and subsequent descrambling of the unviewable signal for proper display on TV. The subscriber set-top equipment 38 is modified to provide the scrambling capability of the standard TV signal using the CCD-based scrambler/descrambler module.

A composite signal is transmitted from the video Head-End 35 via the hybrid fiber-coax or other transmission media 36. At the set-top box 38, The RF/IF stage 37 selects a single TV channel 39 from the composite signal by appropriately setting its IF frequency to that of the viewer selected channel. The output signal 39 of the RF/IF stage is an analog TV waveform consisting of the video lines and horizontal and vertical synchronization pulses. The CCD-based scrambler/descrambler hardware 40 scrambles the video signal by rearranging the analog samples of the input signal in a random order. Standard TV sync pulses and additional control bits are then added to the scrambled signal. This sampled signal is then low-pass-filtered to reconstruct the standard TV signal 44 which contains the shuffled video scan lines. The sync pulses are added for the purpose of recording the resulting video signal on a standard VCR tape using the VCR unit 45. Several information bits are inserted to provide authorization and random seed data. The VCR is used to record the scrambled video signal.

To descramble and view the stored movie title, the VCR unit output signal 43 is fed back to the CCD-based scrambler/descrambler module 40. The CCD-based descrambler circuitry separates the authorization and control bits and the sync pulses from the video signal and detects the random shuffling seed which was originally used to scramble the input video signal 39. Using the recovered seed, the descrambler circuitry reorders the analog samples in order to generate the descrambled video signal 41 which can be viewed on the TV monitor 42.

The authorization and control bits are modulated and inserted in the video signal unscrambled, although they can be encrypted to provide added security against unauthorized use. Additional coded security bits are also inserted to assure that only the authorized set-top boxes and in particular the one originally used to scramble the video title can reconstruct the signal. This provides the added security needed in the distribution of the program titles by discouraging tape duplication and preventing intelligible viewing of the program titles by unauthorized subscribers.

Figure 6:
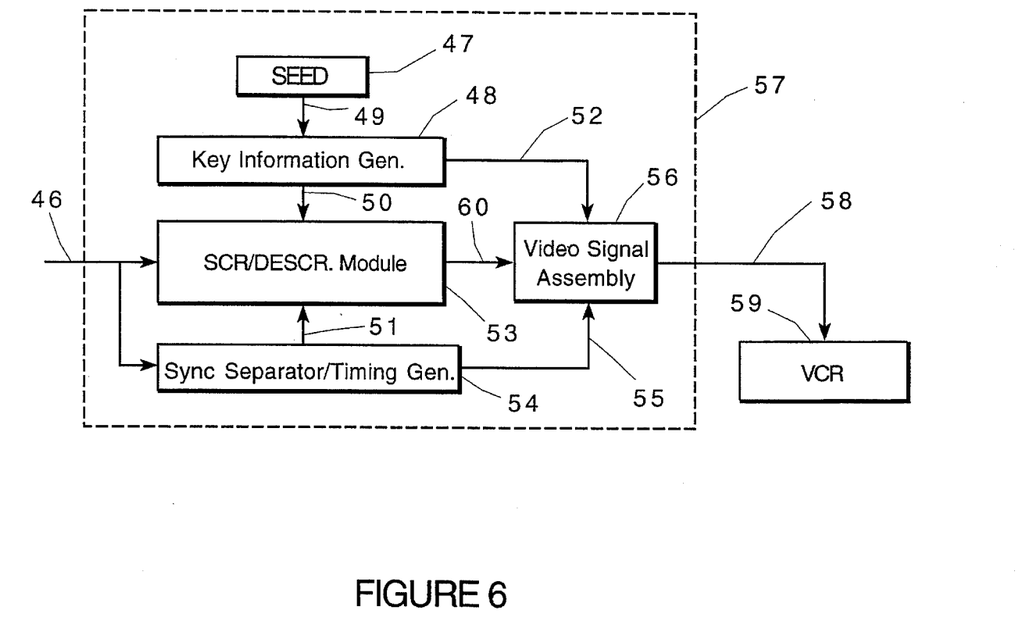
FIG. 6 is a block diagram of the CCD-based waveform scrambler device as it is used to scramble the TV signal before it is recorded on a VCR tape.

FIG. 6 illustrates the block diagram of the waveform scrambler device 57 used to scramble a TV signal before it is recorded on a VCR tape. This system accepts a standard TV signal, separates and scrambles the active video section of each video line by shuffling the analog samples of the video lines randomly, and reassembles the TV signal by adding the sync pulses. The output signal can be stored on any standard VCR tape. The system can be incorporated into the design of a set-top box.

The input TV signal 46 can be a standard NTSC signal with a bandwidth of 6 MHz. This signal consists of video, sync pulses and audio components. The analog samples of the TV signal are shuffled in a random sequence by the scrambler module 53. In order to synchronize the scrambling process with the incoming TV video lines, the video sync pulses part of the incoming waveform are separated by the Sync Separator/Timing Generator module 54 to generate the clock and timing references 51 and 55 used to synchronize and control the data flow throughout the entire system. The SEED generator 47 outputs the random seed 49 which is used by Key Information Generator module 48 to generate the random shuffling sequence 50 needed by the scrambler/descrambler module to determine the sample shuffling sequence. The scrambled analog video samples 60, the sync references 55, and the random seed 52 are sent to Video Signal Assembly module 56 in order to assemble the standard TV signal 58 for recording on the VCR unit 59.

Additional timing and random seed information can be inserted in the TV signal in several ways without interfering with the normal picture signals. These include use of the horizontal blanking interval, the vertical blanking interval, the audio channel (by using time of frequency multiplexing), and the video channel (by using time or frequency multiplexing). The SCR./DESCR. module extracts this information and uses it during the descrambling process. The details of insertion of the security codes, timing information, and random seed references, sync pulses or encrypted data during the assembly process are not explained here as they are not directly relevant to this invention. However, the CCD-based scrambler, which is the heart of the present invention, is described in detail for illustration of several possible scrambling schemes.

Figure 7:
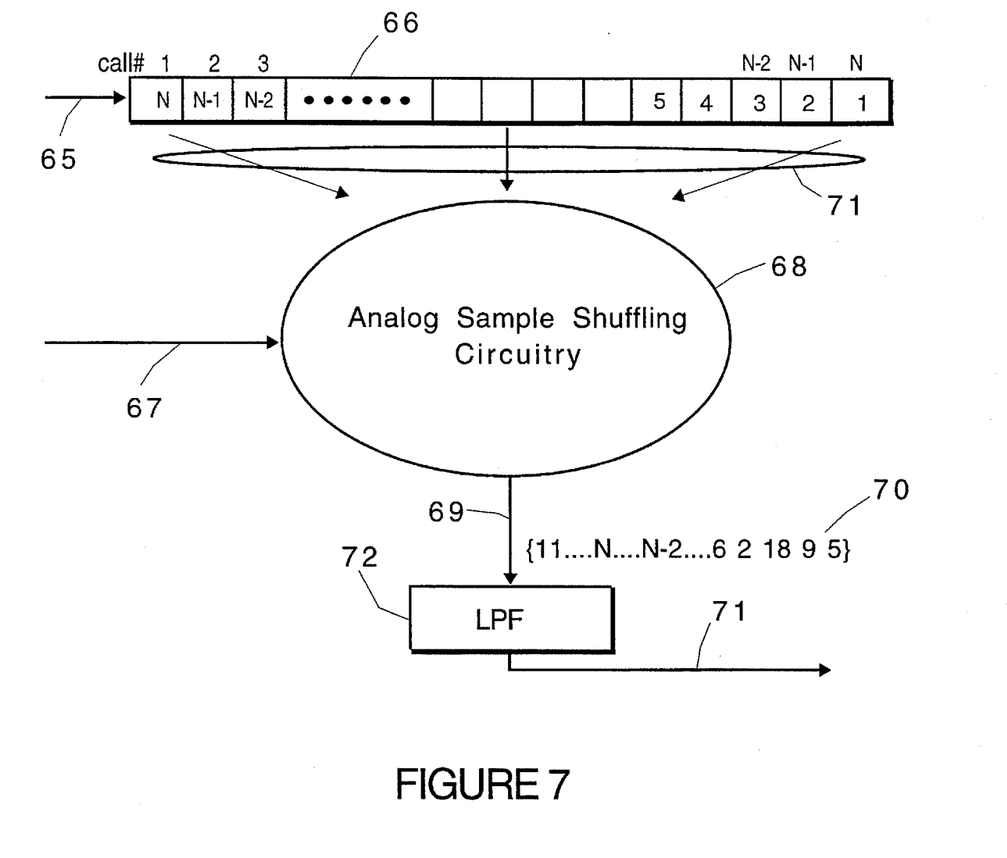
FIG. 7 is a functional block diagram of the CCD-based waveform scrambler/descrambler device.

FIG. 7 illustrates the functional block diagram for a representative CCD-based waveform scrambler. Regardless of the exact scrambler architecture, the overall concept remains the same for all the proposed schemes which follow: The analog samples of the input signal are shifted into a CCD-based shift-register. The shuffled output is either shifted out or read out from the individual shift-register cells with the input clock disabled. The input and output shifting rates are kept equal in order to eliminate the need for additional storage and prevent buffer overflow.

The analog samples of the input signal 65 are shifted into an N-tap CCD-based analog shift-register or delay-line 66 which can hold or shift the equivalent of one active video scan line. Once N analog samples equivalent to one active video scan line are loaded into the shift-register, they are loaded into the shuffling circuitry 68 which randomly reorders the incoming signal samples. The input signal 71 to the shuffling circuitry consists of the set {N N-1 ... 5 4 3 2 1}. Therefore the output signal 69 of the shuffling circuitry consists of stream of analog signal sets 70 which are the shuffled samples of the original sets {N N-1 ... 5 4 3 2 1}. The mapping rule is controlled by the random shuffling seed input 67. Depending on the scrambler architecture, circuit 68 may consist of additional components or additional CCD-based delay lines. The shift-register shown here is generic; depending on the architecture of the scrambler, more than one CCD-based shift-register of length smaller than N may be used to shift or store the incoming analog samples equivalent of one active video scan line. For the case of the NTSC TV signals, the N-stage shift-register can store the equivalent of one active video scan line (54 microseconds). If shorter length CCD-based delay lines are available, then I blocks each of length N/I can be used to accommodate the active part of a full video line.

The low pass filter 72 reconstructs the analog TV video scan lines from the analog samples 69. Although it not shown here, but the analog output signal 73 is combined (in time) with several layers of encrypted security codes, random seed, TV synchronization pulses and blanking levels, sound and color carriers to create the standard TV signal scan lines. The overall system synchronization signals are obtained from the original input signal 65. The resulting signal has the standard TV signal format which and can be stored on a standard VCR tape.

Figure 8:
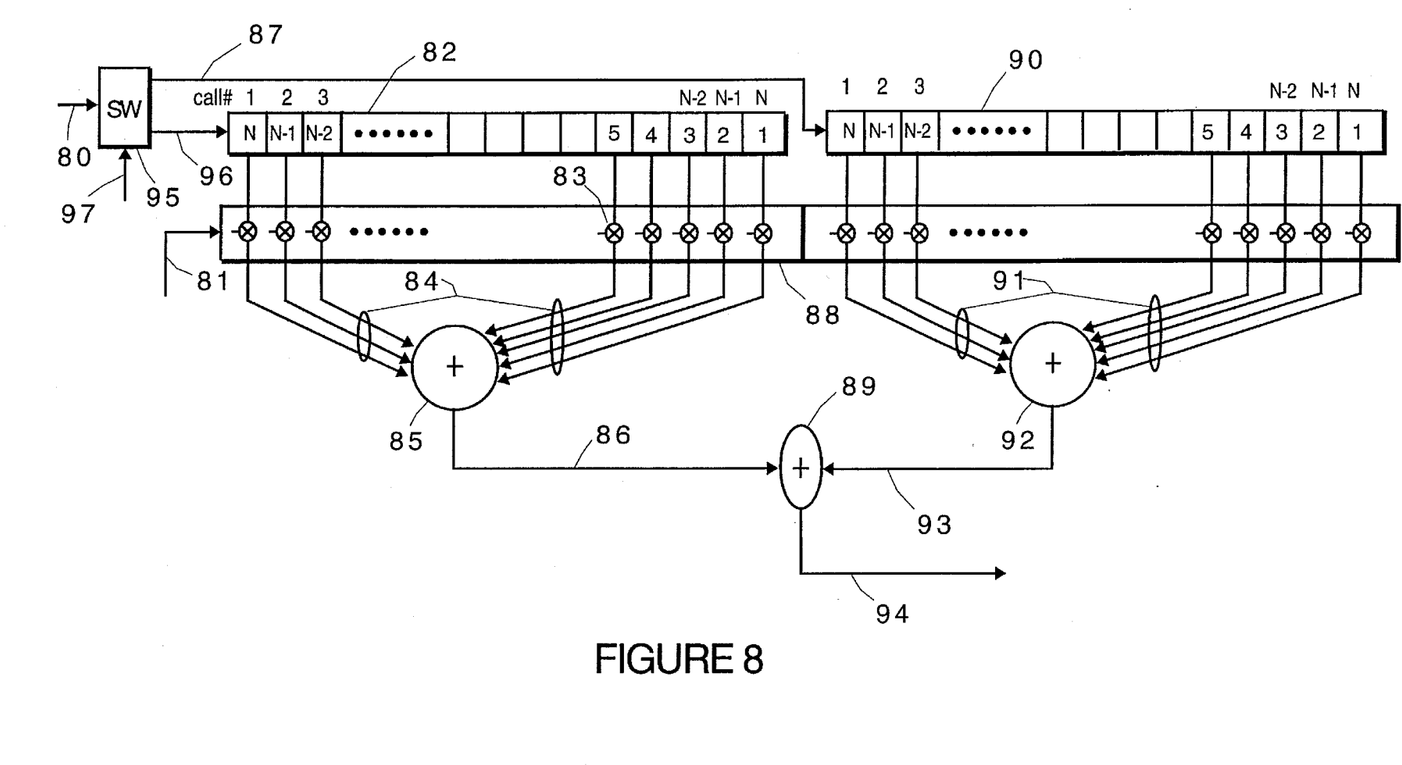
FIG. 8 is a block diagram for the first CCD-based waveform scrambler device architecture incorporating the invention.

FIG. 8 illustrates the block diagram for the first embodiment of a CCD-based waveform scrambler device architecture incorporating the invention. This architecture supports random shuffling of N analog samples of a waveform at a time. The random shuffling of an N-sample long input stored by one of the shift-registers (with its input clock disabled) is performed while the other shift-register is loaded with incoming analog signal samples. The architecture requires two identical CCD-based shift-registers and two N-stage multiplier modules with individually selectable tap coefficients.

The input to the switch 95 is the incoming analog signal 80. The outputs 87 and 96 of the switch route the incoming signal to one of the two CCD-based shift-registers 82 and 90. Each shift-register is of length N to store N analog samples. The control signal 97 alternates the switch output selection at a rate of 1/NT, where T is the input sample shifting period; the state of the switch remains unchanged while N samples are loaded into the selected shift-register. Module 88 consists of two N-stage multipliers. The input to each multiplier is a set of N analog samples associated with one of the N-stage CCD-based shift-registers. Of the N tap coefficients for each multiplier, N-1 taps are set to zero, with the remaining coefficient to be one (1). The position of this single tap is determined by the random seed generator 81. By setting one coefficient to 1 and resetting all the remaining N-1 coefficients to zero, only one signal sample is passed to the output 94 as the remaining inputs to the adders 85 and 92 are zero. Therefore during CCD clocking period, one port among the 2N signal lines 84 and 91 carries one of the N analog samples stored on one shift-register while the remaining 2N-1 signal lines are set to zero. To accomplish this, during the whole transfer period of NT seconds, the clock input to the shift-register which is being read remains disabled. During a time window of NT seconds, this shift-register holds the analog sample values as they are not shifted. The multiplier then reads N analog samples, one at a time, by randomly loading one of the tap coefficients 83 with a value equal to one and resetting the remaining N-1 coefficients to zero. The presence of three adders 85, 89, and 92 is for illustrative purposes only; there may be more or less number of adders used in the hardware design depending on the input capacity of each adder and actual implementation. Two N-stage shift-registers are needed to insure that no data is lost during the shuffling. To keep the input and output rates equal, one output sample is generated for every input analog sample which is loaded in.

Figure 9:
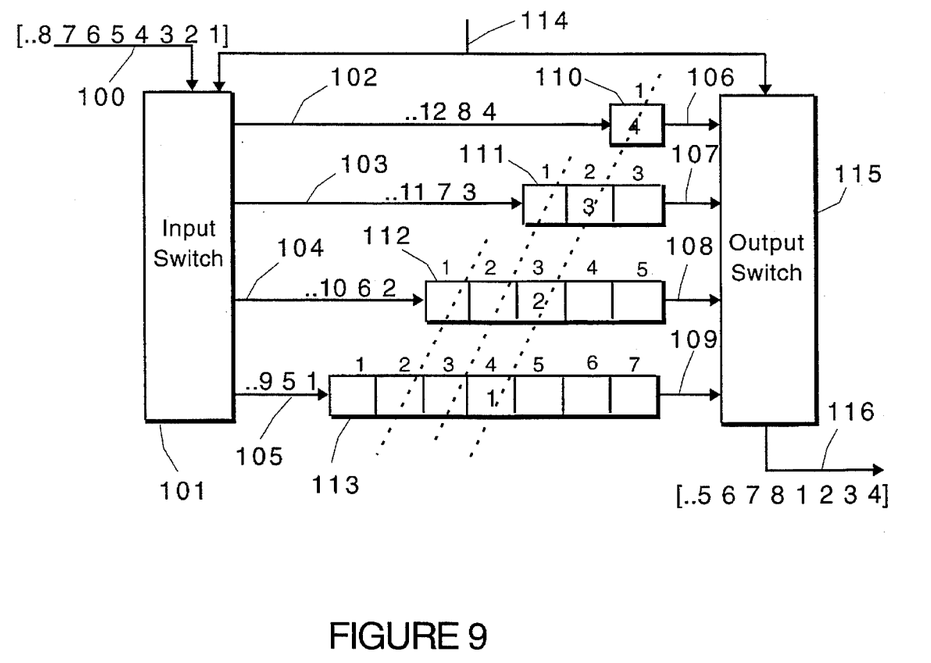
FIG. 9 is a block diagram for the second CCD-based waveform scrambler device architecture incorporating the invention.

FIG. 9 shows the block diagram for the second CCD-based waveform scrambler device architecture incorporating the invention. This architecture reverses the order of the N-sample long input, one line at a time, by loading each incoming sample into a different CCD-based shift-register. In the example shown here, the order of four input analog sample sets is reversed and sent to the output port. This architecture requires the fabrication of several variable-length CCD-based shift-registers to eliminate the gaps which would otherwise appear at the output.

The input samples 100 are loaded into the shift-registers 110 thru 113 sequentially in reverse order, i.e., the first sample 1 arriving is loaded into the last shift-register 113, the second sample 2 arriving is loaded into shift-register 112, etc. This is controlled by the input select signal 114 which controls the state of the input switch 101. For illustrative purposes, four variable-length CCD-based shift-registers 110 thru 113 with inputs 102 thru 105 and outputs 106 thru 109 are shown for storing the incoming analog samples of the original input signal. The output signal 116 is selected from the output switch 115 as it reads the output of the shift-registers in a sequential order opposite to that of the input switch; the output sample 106 of the shift-register 110 is read when the input sample is loaded into the shift-register 113, the output sample 107 of the shift-register 111 is read when the input sample is loaded into the shift-register 112, etc. The control signal 114 synchronizes the input and output switches.

Figure 10:
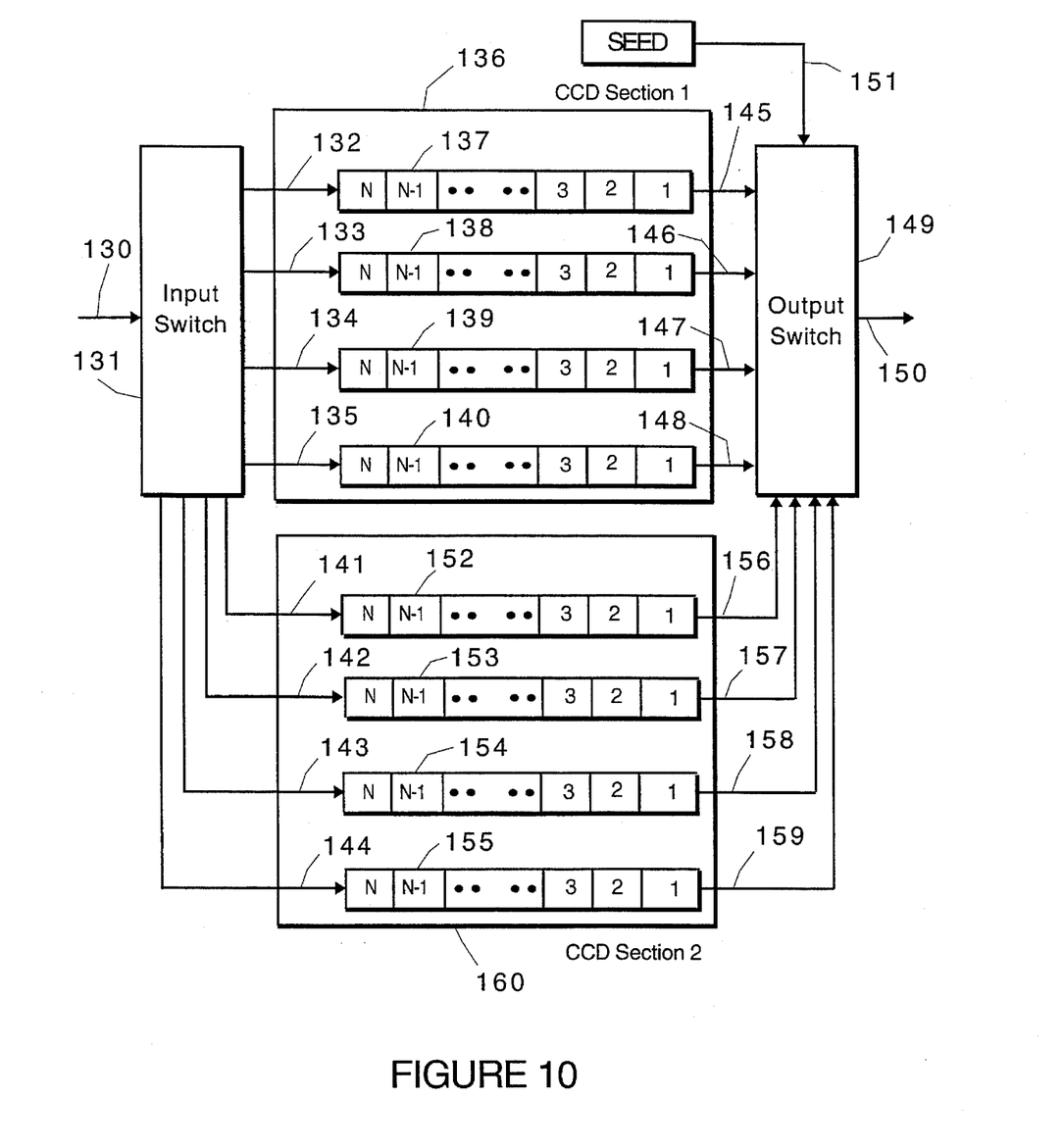
FIG. 10 is a block diagram for the third CCD-based waveform scrambler device architecture incorporating the invention.

FIG. 10 illustrates the block diagram for the third CCD-based waveform scrambler device architecture incorporating the invention. This architecture operates on a fixed number (4 in the example here) of N-sample long input blocks and randomly shuffles the order or whole signal lines. It requires two CCD-based shift-register sections, each consisting of several N-stage shift-register blocks.

The input switch 131 routes the analog samples to one of the four shift-registers within a CCD-based shift-register section. The output switch 150 receives the output of the shift-registers within a shift-register section while the other section's shift-registers are loaded with input signal samples. The clock input to each shift-register within a section in enabled sequentially (one at a time for a duration of NT seconds where T is the clocking rate) to prevent loss of data; while one shift-register is read out the remaining shift-registers within that section hold the charges with their clock inputs halted.

Two shift-register sections 136 and 160 each consisting of four CCD-based shift-registers are used ror continuous loading and temporary storage of the analog samples of the incoming signal 130. For the case of the TV signal, each shift-register holds a whole or a section of a whole video line. Once the first section shift-registers 137 thru 140 are fully loaded with analog samples of the incoming signal, loaded one shift-register at a time from inputs 132 thru 135, the shifting in all but one of its shift-registers halts and the input analog samples are loaded into the second section shift-registers 152 thru 155 from inputs 141 thru 144. During the time when the shift-registers in the second section are loaded with the input samples, the input clock signals to the shift-registers in the first section are enabled one at a time in a random order to produce the output signal 150. In order to prevent loss of data, the clock input to the shift-registers within a section halts once they are loaded with input signal samples. The order of the random shuffling is determined by the seed generator signal 151 which randomly selects any one of the shift-register outputs within a section.

Figure 11:
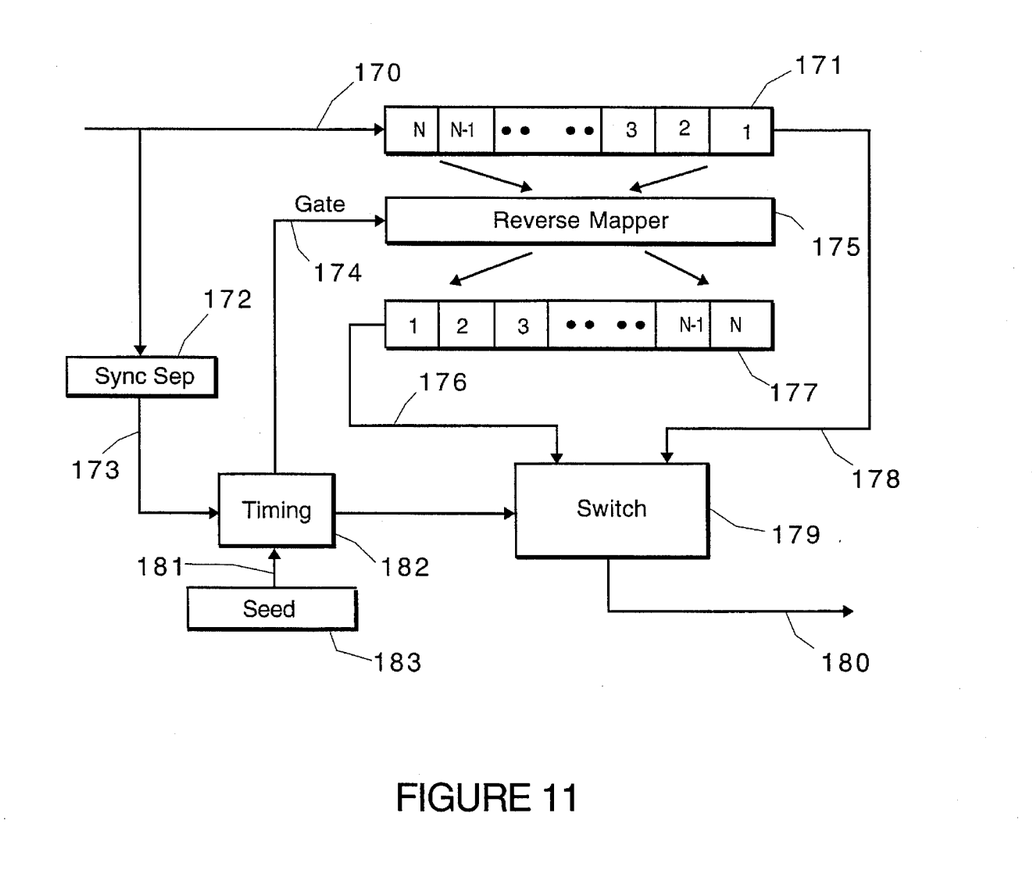
FIG. 11 is a block diagram for the fourth CCD-based waveform scrambler device architecture incorporating the invention.

FIG. 11 illustrates the block diagram for the fourth CCD-based waveform scrambler device architecture incorporating the invention. This architecture operates on N input sample blocks or lines. It can randomly output the original N input sample block or a reordered version of the N input sample blocks. This architecture requires two fixed-length CCD-based shift-registers with parallel load capability. It also requires a mapper which can receive the N input samples from one of the shift-registers, randomly shuffle the order of the samples, and transfer the set into the second shift-register before they are read by the output port. The loading of each N-sample long input block into the second shift-register occurs immediately before loading of the next N sample input signal starts.

The analog samples of the incoming signal 170 are loaded into the first CCD-based shift-register 171. The mapper module 175 transfers the content of the shift-register 171 to the shift-register 177 after the first incoming sample is shifted into the shift-register 171 leftmost cell, i.e., when the shift-register is filled. The transfer is controlled by the Gate signal 174 generated by the timing circuitry 182. Depending on the hardware implementation of the Mapper, the mapping rule can be fixed or randomly changed. Depending on the configuration of the Switch 179, the content of one of the shift-registers is shifted to the output in its entirety. Therefore the output signal 180 is either a replica of the original signal 178 shifted out of the shift-register 171 or an scrambled signal 176 shifted out of the shift-register 177. Although both the shift-registers 171 and 177 are shifting the data out at all times, but only the output of one of them is passed to the Switch output signal 180. Switch 179 state remains fixed for the duration of the transfer of the content of the selected CCD-based shift-register. The sync separator 172 generates the timing references 173 needed for overall system synchronization. The random seed 183 is sent to the Timing module to generate the switch input select signal.

While preferred embodiments of the invention have been shown and described, it will be appreciated that various modifications and adaptations of the invention will be readily apparent to those skilled in the art and such modifications and adaptations are intended to be encompassed within the spirit and scope of the invention.

What is claimed is:

1. A scrambled analog signalling system having a source of analog signals to be sent to a receiving device, comprising:

a multiple stage charge coupled means having analog signal input terminal connected to receive analog signal samples from said source of analog signals, said multiple stage charge coupled device having N stages, corresponding stage taps, and an input clock signal, shuffling circuit means having a first input connected to said N stage taps for receiving the analog signal samples at the said stage taps, a second input for receiving a random seed signal to cause a random reordering of incoming analog signal samples, a source of random seed signals connected to said second input, and an output means connected to receive a stream of said analog signal samples which have been shuffled according to a mapping code carried by said random seed signal, filter means for reconstructing said analog signal in its scrambled format, and transmission means for conveying said analog signal in its scrambled format to said receiving device.

2. The scrambled analog signalling system defined in claim 1 wherein said receiving device includes an N stage charge coupled means having an analog signal input terminal connected to receive said analog signals in scrambled format and having N stage taps, and a deshuffling circuit connected to said N stage taps for reconstituting said analog signals.

3. An analog scrambling signalling system having a source of analog signals to be scrambled and sent to a receiving device, comprising:

two multiple stage, charge coupled devices (CCDs), each CCD having an analog signal input terminal connected to receive analog signal samples from said source of analog signals, each said multiple stage charge coupled device having N stages, corresponding stage taps, and an input clock signal, switch means for alternately connecting said multiple stage CCDs to said source of analog signals at a rate of I/NT where T is an input sample shifting period, a pair of N stage multipliers, each multiplier having a first input connected to corresponding N stage taps of said CCDs, respectively, to receive the analog signal samples at the said stage taps, second input for receiving a random seed signal to cause a random reordering of incoming analog signal samples, and N stage outputs, a source of random seed signals connected to said second input, and adder means connected to said pair of multiplier N stage outputs for receiving a stream of said analog signal samples which have been shuffled according to a mapping code carried by said random seed signal.

4. A scrambled analog signalling system having a source of analog signals to be sent to a receiving device, comprising:

a plurality of multiple stage charge coupled devices (CCDs) having analog signal input terminal connected to receive analog signal samples from said source of analog signals, each said multiple stage charge coupled device having different number of stages, corresponding stage taps, and an input clock signal, an input switching circuit having an input connected for receiving the analog signal samples from said source and a plurality of outputs connected on a one-to-one basis with the analog signal input terminal of said CCD device, respectively, and a second input for receiving a switching control signal to cause a random switching of incoming analog signal samples, a source of switching control signals connected to said second input, an output switch circuit controlled by said switching control signal and connected on a one-to-one basis with each of said CCDs, respectively, to receive a stream of said analog signal samples.

5. A scrambled analog signalling system having a source of analog signal signals to be sent to a receiving device, comprising:

a plurality of multiple stage charge coupled devices (CCDs), each having analog signal input terminal connected to receive analog signal samples from said source of analog signals, each said multiple stage charge coupled device having N stages, corresponding stage taps, and an input clock signal, an input routing switching circuit having an input connected to receive the analog signals from said source and a plurality of outputs, said outputs being connected on a one-to-one basis to the analog signal input for said CCDs, respectively, an output switch connected to receive the outputs of all said CCDs having an output terminal, and a source of said signals connected to said output switch for randomly selecting and coupling the output terminal of said output switch.

6. An analog signalling system having a source of analog signals to be sent in scrambled form to a receiving device, comprising:

first and second multiple stage charge coupled devices (CCDs), each CCD having analog signal input terminal connected to receive analog signals from said source of analog signals, each said multiple stage charge coupled device having corresponding N stages, respectively, corresponding stage taps, respectively, and an input clock signal, a shuffling circuit including a reverse mapper circuit connected between said first and second CCDs, transmission means for conveying said analog signal in its scrambled format to said receiving device, and switch means alternately connecting said first or said second CCD to said transmission means.

* * * * *